United States Patent
Benge et al.

(10) Patent No.: US 10,509,639 B2
(45) Date of Patent: Dec. 17, 2019

(54) AUTOMATIC SOFTWARE-UPDATE FRAMEWORK

(71) Applicant: Rimini Street, Inc., Las Vegas, NV (US)

(72) Inventors: Jim Benge, Livermore, CA (US); Richard Frank, Pleasanton, CA (US); Don Sheffield, Palm Harbor, FL (US); Doug Baron, Centreville, VA (US)

(73) Assignee: Rimini Street, Inc., Las Vegas, NV (US)

( * ) Notice: Subject to any disclaimer, the term of this patent is extended or adjusted under 35 U.S.C. 154(b) by 73 days.

(21) Appl. No.: 14/729,579

(22) Filed: Jun. 3, 2015

(65) Prior Publication Data

US 2015/0355896 A1 Dec. 10, 2015

Related U.S. Application Data

(60) Provisional application No. 62/007,918, filed on Jun. 4, 2014.

(51) Int. Cl.
*G06F 8/65* (2018.01)
*H04L 29/06* (2006.01)

(52) U.S. Cl.
CPC .............. *G06F 8/65* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,401,239 B1* | 6/2002 | Miron | G06F 8/68 707/661 |
| 2003/0046260 A1* | 3/2003 | Satyanarayanan | G06F 17/30106 |
| 2006/0031420 A1 | 2/2006 | Ferguson et al. | |
| 2006/0095914 A1 | 5/2006 | Mankovski | |
| 2006/0173856 A1 | 8/2006 | Jackson et al. | |
| 2008/0174238 A1 | 7/2008 | Jeong et al. | |
| 2012/0042003 A1* | 2/2012 | Goetz | G06F 9/5066 709/203 |
| 2012/0084114 A1 | 4/2012 | Prow et al. | |
| 2012/0117532 A1* | 5/2012 | Knepper | G06F 8/60 717/101 |
| 2014/0007070 A1* | 1/2014 | Huang | G06F 8/65 717/170 |

(Continued)

OTHER PUBLICATIONS

International Search Report with Written Opinion dated Aug. 27, 2015 in Application No. PCT/US2015/034111, 11 pages.

(Continued)

*Primary Examiner* — Daxin Wu
(74) *Attorney, Agent, or Firm* — Shook, Hardy & Bacon LLP

(57) ABSTRACT

An automation framework for providing updates in a distributed environment includes various elements. The framework provides tasks to a client environment, such as a software update. An update can be developed and tested for one client environment. That update can be reduced to a set of data that can be used to create updates for other client environments that include a same version of the program. In addition, a respective script can be generated for each client environment based on the specific client environment.

4 Claims, 7 Drawing Sheets

(56) References Cited

U.S. PATENT DOCUMENTS

| | | | | |
|---|---|---|---|---|
| 2014/0156742 | A1* | 6/2014 | Liu | H04L 67/42 709/203 |
| 2015/0026675 | A1* | 1/2015 | Csaszar | G06F 8/61 717/178 |
| 2015/0304843 | A1* | 10/2015 | Hillyard | H04W 12/06 726/5 |
| 2015/0331755 | A1* | 11/2015 | Morgan | G06F 17/3033 707/646 |

OTHER PUBLICATIONS

International Preliminary Report on Patentability dated Dec. 15, 2016 in International Application No. PCT/US2015/034111, 10 pages.

* cited by examiner

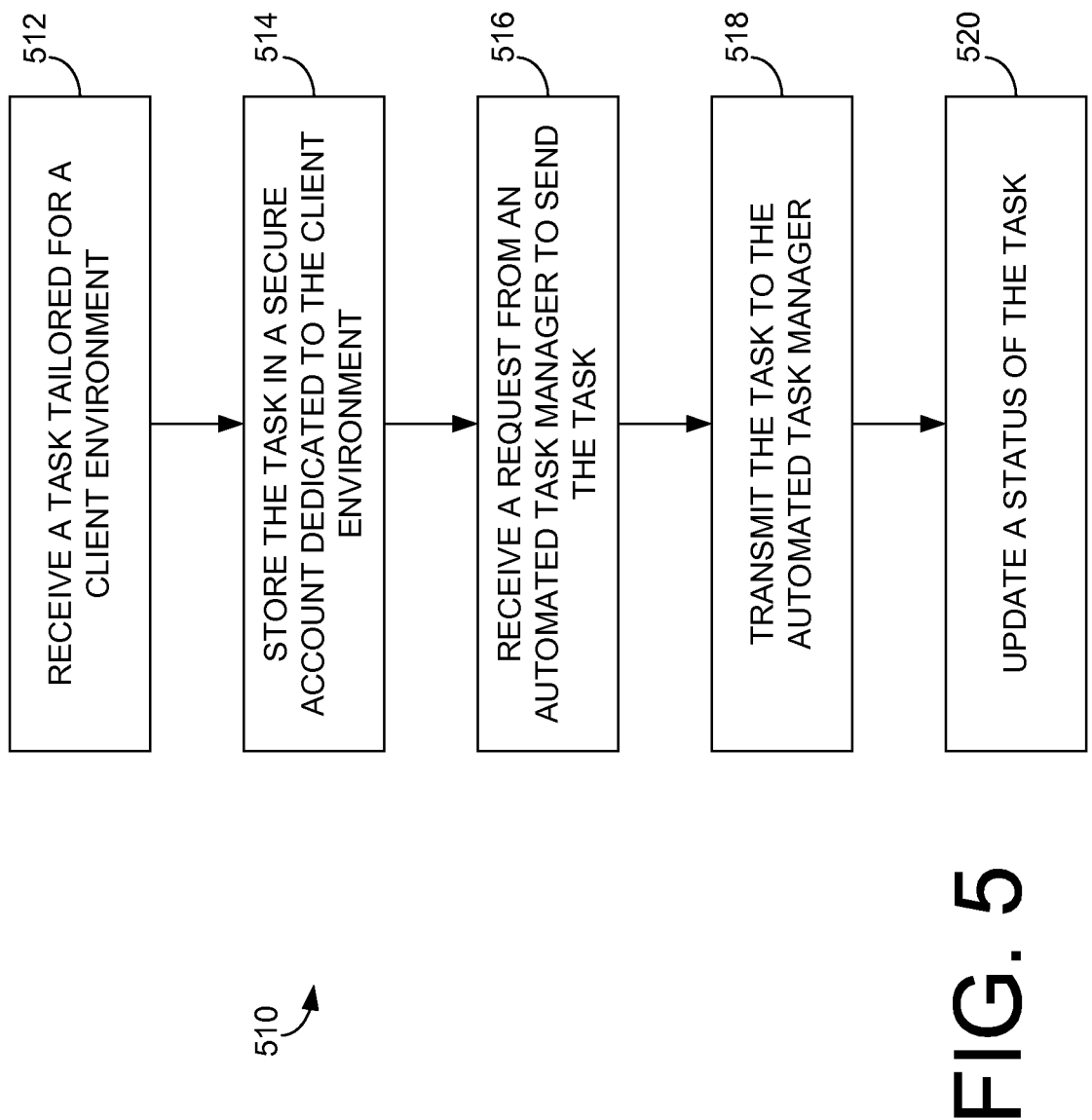

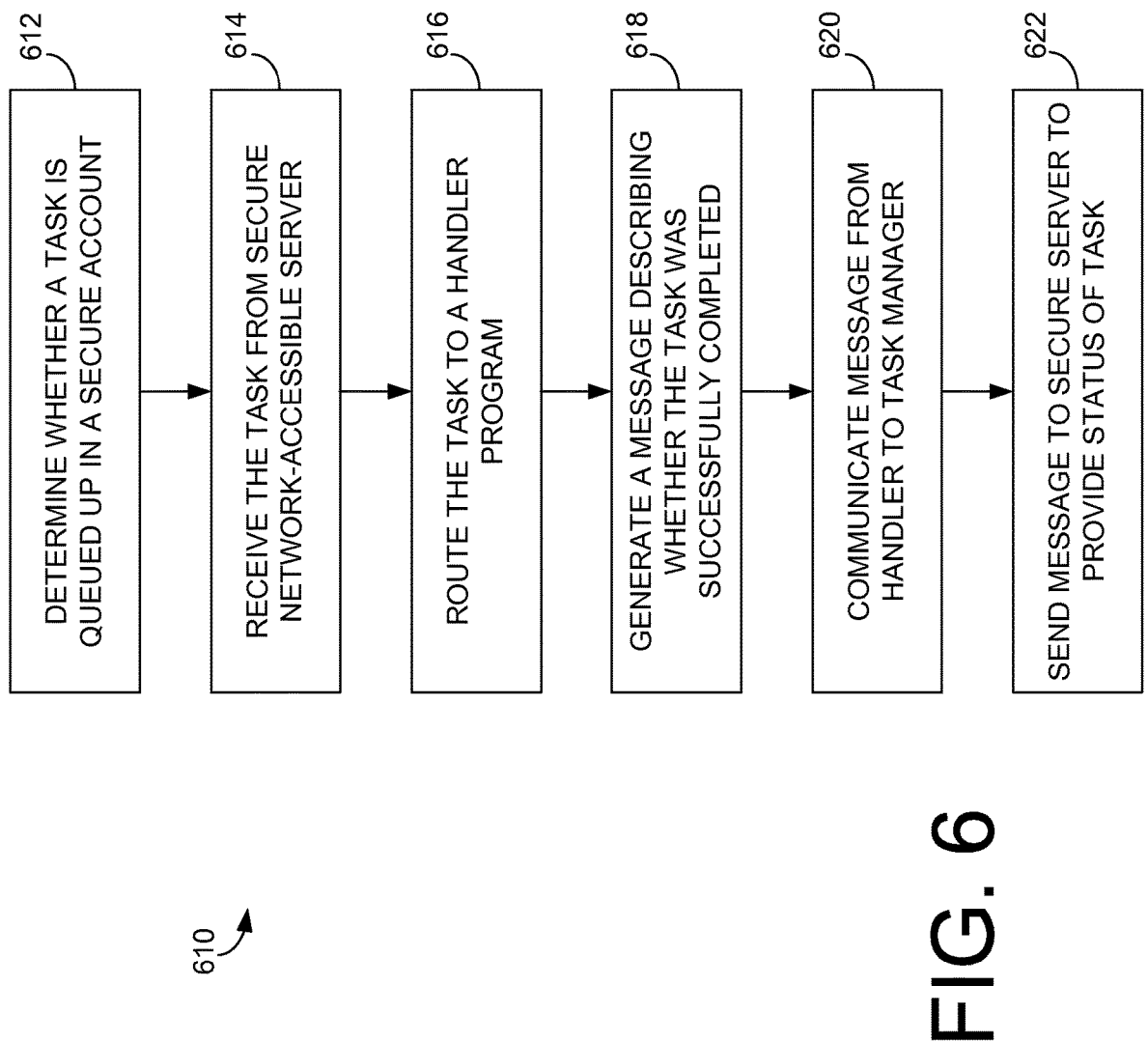

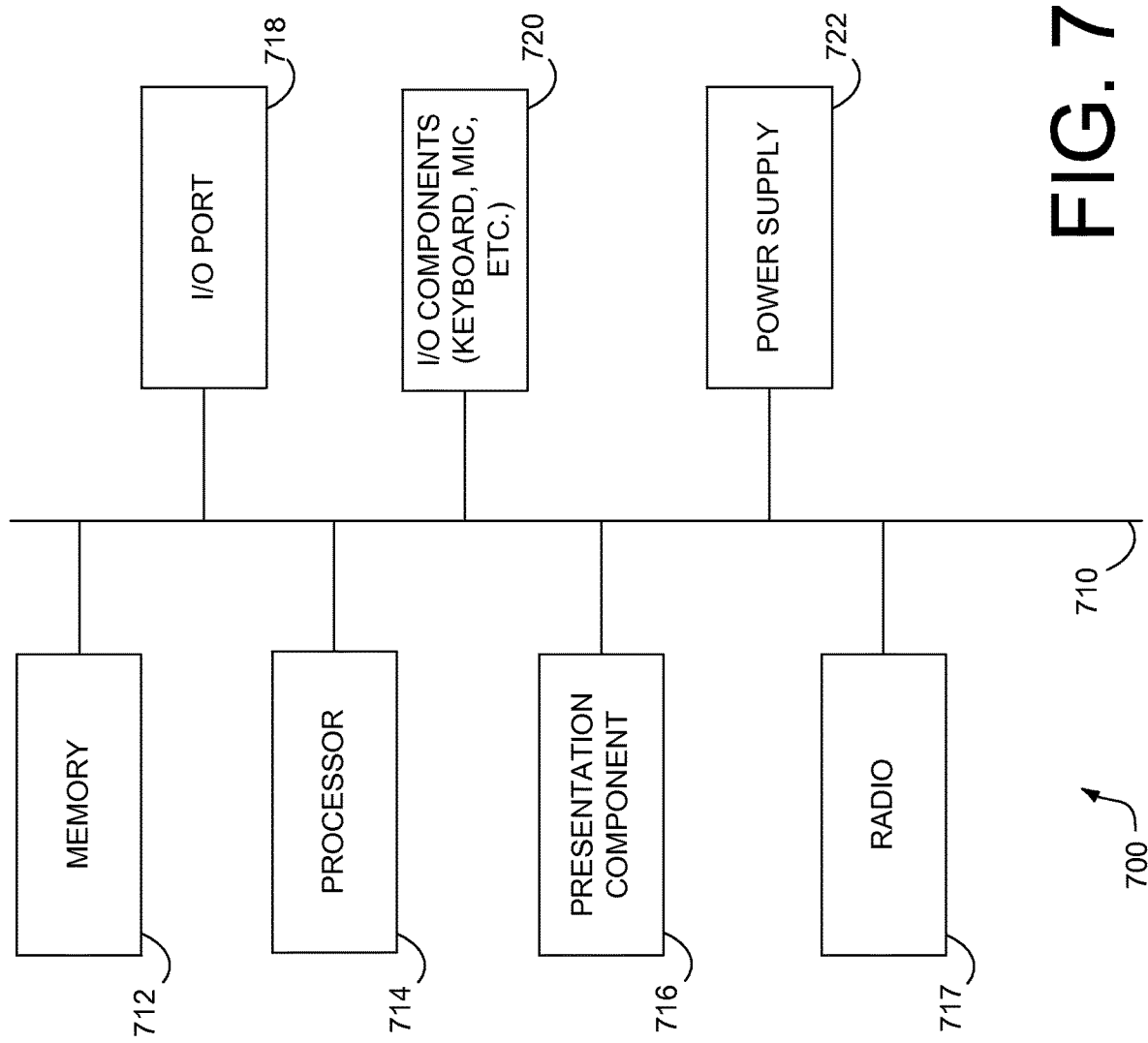

AUTOMATIC SOFTWARE-UPDATE FRAMEWORK

CROSS-REFERENCE TO RELATED APPLICATIONS

This is a nonprovisional patent application claiming priority to provisional patent application number U.S. 62/007,918, which was filed on Jun. 4, 2014.

FIELD OF INVENTION

This description describes providing software updates in a network environment.

BACKGROUND

Software programs are available to perform a wide variety of operations. Often parts of a software program are changed to modify operations, and these changes can be implemented using a software update. For example, a software program might rely on information that is subject to change, such as laws, tax percentages, and regulations, and an update can be provided to a software program to implement changes in these types of information.

Sometimes a plurality of different client environments include the same version of a software program, such that a particular update should be created for each client environment.

SUMMARY

An embodiment of the present invention is directed to a framework that provides tasks to a client environment, such as a software update. An update can be developed and tested for one client environment. That update can be reduced to a set of data that can be used to create updates for other client environments that include a same version of the program. In addition, a respective script can be generated for each client environment based on the specific client environment.

One embodiment of the present invention includes computer-readable storage media storing information that, when executed by one or more computing devices, performs operations for updating software in a distributed environment. The operations include receiving, by a secure network-accessible server, a task that is tailored for a client environment and storing the task in a secure account that is dedicated to the client environment. The operations also include receiving a request, from an automated task manager running on a client device in the client environment, which is authenticated to the secure account, to send the task. The task is transmitted to the automated task manager, and a status of the task is updated.

In one embodiment the operations further comprise monitoring the secure account by a task-monitoring module to determine when the task is queued up in the secure account and when the task is transmitted to the task manager. In addition, the operations might include rendering a task-monitor user interface that communicates with the task-monitor database and that presents the status. In a further embodiment, updating the status includes changing the status from a pending status to an active status by the task-monitoring module when the task is transmitted to the task manager. In addition, the operations might also include receiving a message from the automated task manager that the task is successfully completed, such that updating in the status includes picking up the message by the task-monitoring module and transforming the status from active to a successful-completion status. In a further embodiment, the task-monitor user interface provides a selectable link that, when selected, presents contents of the message that was received from the automated task manager. In another embodiment, the operations further comprise receiving a message from the task manager indicating that the task was not successfully completed. Again, a task-monitoring module might pull the message from the secure account and update the status to include a failed status, the content of the message being viewable in a task-monitor user interface.

Another embodiment of the present invention includes a method or process of updating software in a distributed computing environment. The method or operations might include automatically determining whether a task is queued up by sending a request to a secure account stored on a secure network-accessible server in a server environment. The task is received from the secure network-accessible server hosting the secure account, and the task is received by a task manager running in a client environment. The operations further comprise routing the task to a handler program that is running in the client environment and that carries out the task. The handler program generates a message that describes whether the task was successfully completed, and the message is communicated from the handler program to the task manager. The message is sent to the secure network-accessible server to provide a status of the task.

In one embodiment the method or operations comprise other elements. For instance, the task might include updating a software program running in the client environment, such that the handler program performs the task by transforming the software program to include an update. In another embodiment, updating the software program running in the client environment includes creating a before-update folder in the client environment and populating the before-update folder with a first version of the software program that is to be updated. In addition, the operations might also include calculating a hash value for the first version of the software program and transmitting the hash value to the server running in the server environment. In another embodiment, the operations further include creating an after-update folder in the client environment and populating the after-update folder with a second version of the software program that is to be updated and that is substantially similar to the first version of the software program. Accordingly, updating the software program running in the client environment might include transforming the second version of the software program in the after-update folder to include the update, thereby transforming the software program into an updated software program. In yet a further embodiment, the operations further include generating a data set by comparing the first version of the software program in the before-update folder to the updated software program in the after-update folder, and transmitting the data set to the secure network-accessible server in the server environment. The data set might be encoded to create an encoded data set, which is transmitted to the secure network-accessible server to be made available for other client environments running identical program modules as the first version of the software program. The encoded data can then be utilized by the other client environments to transform the first version of the software program into an updated software program.

Another embodiment of the present invention includes a system of computing components that automatically updates a computer software program in a distributed environment. The system includes a computing device storing a secure account that is maintained in a server environment and that stores a task to be carried out in a client environment. In addition, the system includes computing device running an automatic task manager that runs in the client environment and that automatically retrieves the task by sending a request to the secure account. A handler runs in the client environment that receives the task from the automatic task manager and that carries out the task in the client environment. The handler provides a message that indicates whether task was successfully completed and that is provided to the secure account. The system further includes a task-monitor module running in the server environment that picks up the message from the secure account and stores the messages in a task-monitor database.

The system might include other aspects as well, such as a task-monitor user interface that accesses the task-monitor database and that presents a status update indicating whether the task was successfully completed in the client environment. In one embodiment, the status update is presented together with a client identifier, which is unique to the client environment. The system might also include a client-side program file structure that is maintained in the client environment and that stores one or more code files, which include program code executed to run a program. In addition, a server-side program file structure might be maintained in a file share of the server environment that substantially mirrors an organization of the client-side program file structure. In another embodiment, the server-side program file structure stores one or more hash files that represent the program code.

Embodiments of the invention are defined by the claims below, not this summary. A high-level overview of various aspects of the invention is provided here to introduce a selection of concepts that are further described in the detailed-description section below. This summary is not intended to identify key or essential features of the claimed subject matter, nor is it intended to be used as an aid in isolation to determine the scope of the claimed subject matter.

BRIEF DESCRIPTION OF THE DRAWINGS

Illustrative embodiments of the present invention are described in detail below with reference to the attached drawing figures, which are incorporated herein by reference, wherein:

FIGS. 5 and 6 each depict a respective flow diagram showing operations or steps in accordance with an embodiment of the present invention; and FIG. 7 depicts an exemplary computing environment in accordance with an embodiment of the present invention.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Figure 1:
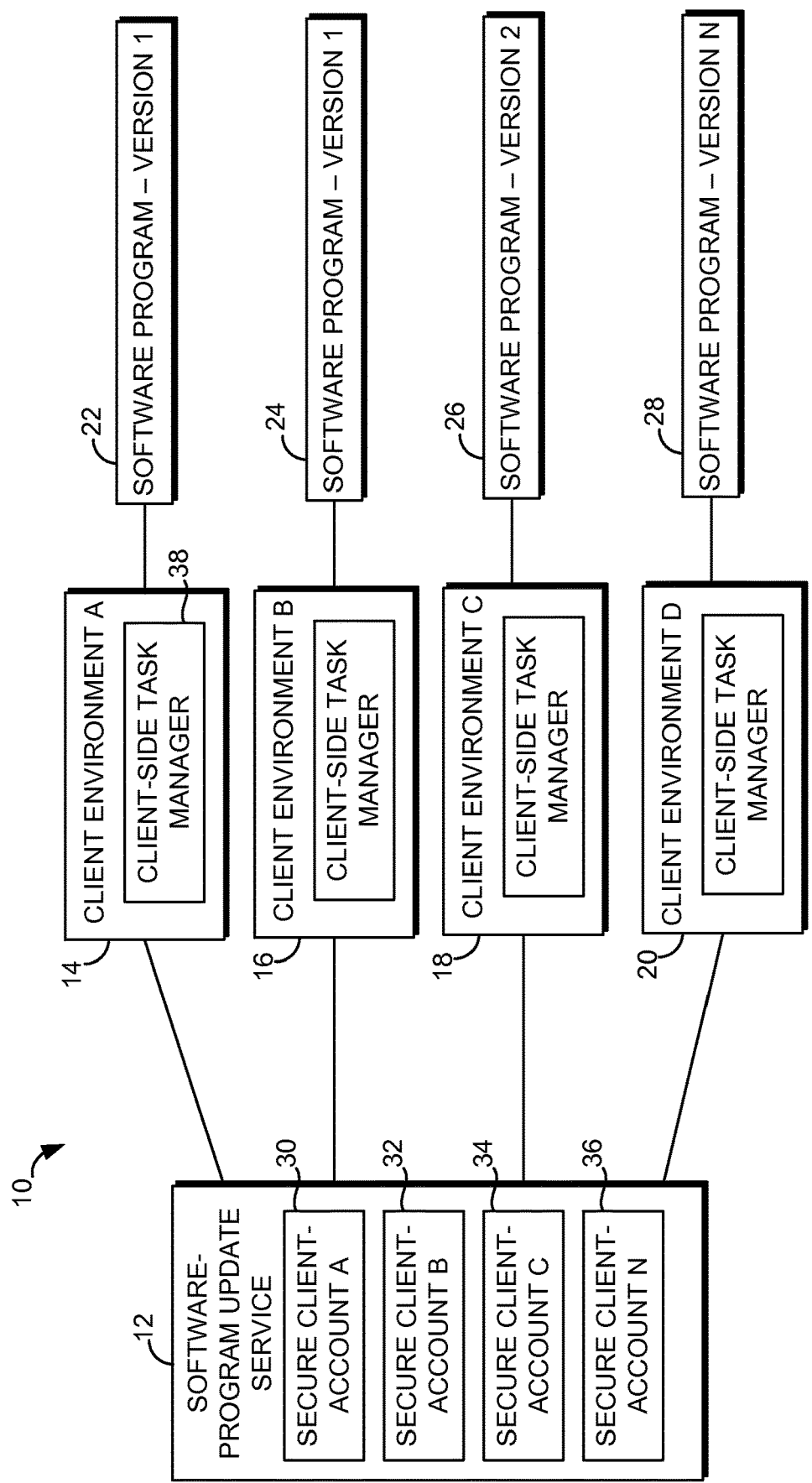
FIG. 1 depicts a diagram of an exemplary network in accordance with an embodiment of the present invention.

At a high level, an embodiment of the present invention is directed to a framework that provides tasks to a client environment, such as software updates. A task can be developed and tested for one client environment. That task can then be reduced to a set of data used to create updates for other client environments, which include a same version of the program. To help illustrate these aspects, FIG. 1 provides a diagram showing a basic client-server structure 10 in which a software-program update service 12 is connected with a plurality of client environments 14, 16, 18, and 20. The client environments might be client hosted or might be hosted by a third-party, and in either scenario, the service 12 is authenticated to the client environment. Although the structure 10 depicts four client environments A, B, C, and D, the structure might include any number of client environments.

Each client environment is running a software program, and some of the clients are running a same version of the software program. For example, client environment A 14 and client environment B 16 are both running version 1 of the software program (22 and 24 respectively), whereas client environment C 18 is running version 2 of the software program 26. Software program 28 is identified as version "N" to convey that "N" could be replaced by any integer to designate a particular version.

In an embodiment of the present invention, the software-program update service 12 provides tasks to be carried out in the respective client environments. As used in this description, a "task" includes a computing operation to be carried out. Examples of tasks include applying an update to a software program, creating one or more folders in a folder structure, generating a script, and packaging an update, among others, and often these tasks are performed in the context of maintaining or updating a software program. In FIG. 1, the service 12 hosts secure client accounts 30, 32, 34, and 36 for each client. When a task is ready for a client environment, the task is uploaded to the respective account for the client environment. For instance, when a task is ready for client environment A 14, the task is uploaded to secure client-account A 30.

In FIG. 1, each client environment runs a client-side task manager, which is configured to access a respective client account. For instance, client-side task manager 38 is configured to access the secure client-account A 30 in order to retrieve tasks for the software program 22. In an embodiment of the present invention, the same task can be provided to client environment A 14 and to client environment B 16 because both client environments are running the same version of the software program 22 and 24. As such, the task for client environment A 14 can be developed and tested for client environment A and then automatically rolled out to client environment B. The structure 10 depicted in FIG. 1 is relatively high level and might include various other components to provide the above-described functionality, as well as additional features, such as those components depicted in FIG. 2.

Figure 2:
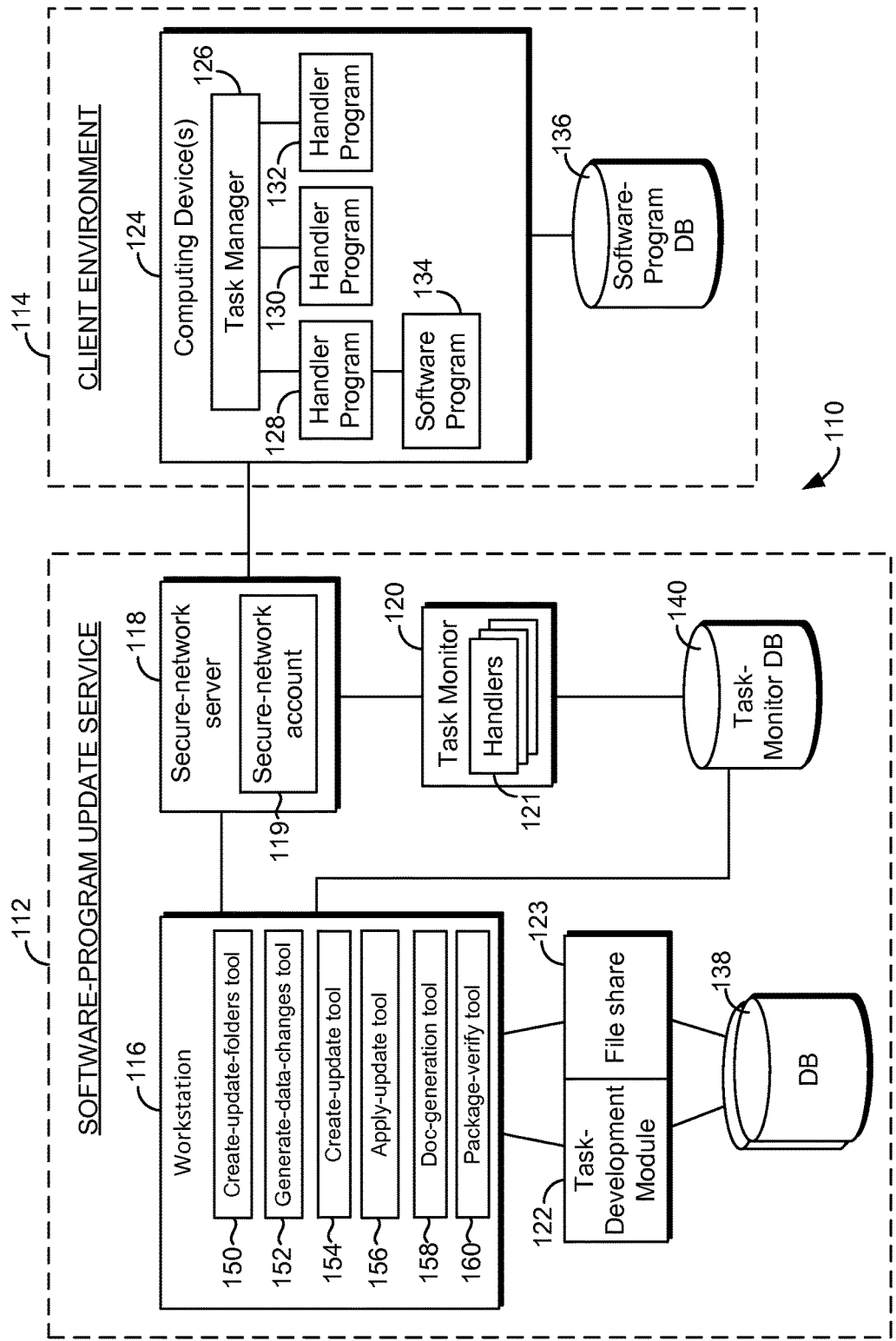
FIG. 2 depicts a diagram of an exemplary network in accordance with an embodiment of the present invention.

Referring now to FIG. 2 a diagram is provided that depicts a client-server environment 110 including a software-program update service 112 that is networked with a client environment 114. The update service 112 is similar to the update service 12 described in FIG. 1, except that additional components of the service are depicted in FIG. 2. In addition, the client environment 114 is similar to the client environments described in FIG. 1, except that additional components are depicted in FIG. 2.

In FIG. 2, the update service 112 includes a workstation 116, such as a desktop, laptop, or other computing device. The workstation is usable to access and communicate with the other components of the update service 112, including a secure-network server 118 hosting a secure-network account 119, a task monitor 120, and a task-development module 122. Although some of the components of the update service 112 are depicted as singular components, any of the components might include a plurality of devices, such as a plurality of workstations, a plurality of servers, or a plurality of databases. In addition, one or more of the components depicted as part of the update service might run on a virtual machine.

The task-development module 122 provides access to the database 138, which stores information describing each client environment (e.g., client environments A-D depicted in FIG. 1). The database 138 stores information describing software-program versions, client-folder organization, code-object listings, among a variety of other information. At a high level, a developer at the workstation 116 creates and tests a task using the task-development module 122. Using the workstation 116, the task is uploadable to the secure-network account 118 and made available for the client environment 114.

The server-side task monitor 120 tracks the status of the task, including whether the task was retrieved by the client environment 114 and whether the task was successfully installed. For example, the task monitor 120 picks up messages (e.g., requests) that are provided from the client-side task manager 126 to the secure-network account 119 and passes the messages to the appropriate one of the handlers 121. The messages or other information that are picked up by the task-monitor 120 are stored in the task-monitor database 140, such as in database rows. The task-monitor database 140 can be accessed via the workstation 116 using a task-monitor user interface to view the status of a task as well as the messages picked up from the secure-network account 119. In one embodiment, the task-monitor user interface accesses the database rows directly.

After a task has been posted to the secure account 119, a status of the task can be viewed by accessing a user interface of the task monitor 120. Examples of statuses include "Pending," "Active," "Success," and "Failed." A "pending" status indicates that a task is currently posted to the secure account and is queued for processing. An "active" status indicates that the task has been sent to the client-side task manager 126 and is being processed in the client environment. A "success" status indicates that a task has been completed normally. A "failed" status indicates that a task was terminated with an error message. The messages related to a task are filterable based on various criteria, such as time duration (e.g., show all messages within the past N hours or days). In cases in which a same task is provided to two different client environments, the messages related to that task might be grouped and selectable based on the client.

In a further embodiment, a file share 123 is maintained by the update server 112, the file share 123 including a folder structure similar to folder structures in each of the client environments (e.g., client environments A, B, C, and D in FIG. 1). As will be explained in greater detail in other parts of this detailed description, the file share 123 can be utilized to help determine which versions of a software program are being utilized by which clients. That is, in one aspect of the present invention, the client folder structure retains and stores the client deliverables, which can be less accessible for the update service 112 to reference. Thus, the file share 123 is maintained to help track which updates have been made in a client environment, as opposed to analyzing the actual client deliverable. The file share 123 can also be used to identify a group of clients that are running a same version of a software program. Among other information, the folder structure in the file share 123 might also contain an additional set of client-level folders to summarize all of the clients impacted by the update. In one embodiment, the folders in the file share 123 include only hash representations of the program modules, as opposed to the actual program modules. In this embodiment, no software or code from any client environment needs to be maintained on the file share 123.

Having described some of the details of the update service 112, the client environment 114 will now be described in a little more detail. The client environment 114 includes a client-hosted or cloud-based environment having one or more computing devices 124 that are running various applications. For example, the computing device 124 runs a client-side task manager 126, client handler programs 128, 130, and 132 and a software program 134 that leverages information stored in the software-program database 136. At a high level, the task manager 126 automatically checks the secure-network account 119 utilized by the updated service 112 to determine if any tasks are available for the client environment 114. If a task is available, the task manager 126 receives the task from the secure-network server 118 and passes the task to an appropriate client handler program.

As previously described, the task might include various types of operations and an appropriate client handler program is selected based on the operation. For example, the handler program 128 might be configured to apply an update to the software program 134. Each of the other handler programs might be configured to perform other operations, such as creating or updating a folder, creating an update script, or packaging an update. The appropriate handler program carries out the task, and a message (e.g., request) is provided from the task manager 126 to the secure-network account 119. Although only three handler programs 128, 130, and 132 are depicted in FIG. 2 for illustrative purposes, any number of handler programs might be included for performing various desired operations. The handler programs 128, 130, and 132 are described in additional detail in other parts of this description. Once the message has been provided from the task manager 126 to the secure-network account 110, the update-service task monitor 120 can then pick up the message from the secure-network account 119 and pass it to an appropriate one of the server-side handlers 121.

Having described an overview of some operations carried out in the environment 110, some additional aspects will now be described with respect to FIGS. 1 and 2, such as how a task is created in the update service 112 and how a task is executed in the client environment. In some embodiments, an update that is to be made to the software program 134 will include a modification to a batch program or a code object. Accordingly, using the workstation 116, each impacted client environment is identified in the task-development module 122. That is, the task-development module 122 provides a graphical user interface that allows the workstation 116 to select clients, identify objects, and retrieve other information from database 138. For example, if the update affects version 1 of the software program 22 and 24, then client environment A 14 and client environment B 16 are impacted clients. As such, client environment A 14 and client environment B 16 are selected to be within the scope of the update. In addition, the code objects that reside in the client environment and that will be affected are also identified by accessing the database 138. For example, database 138 stores a listing of objects that are in the client environment, such as SQR/SQC and COBOL. Those objects that are listed can be selected as part of the update.

Once the affected clients and code have been identified in the task-development module 122, a create-update-folders tool 150 is used to generate a task (e.g., a request file), which is placed in the appropriate secure-network client account 119. The task instructs each impacted client to create and update folders in the client environment that are used to update the software program 134. For example, if client environment A 14 and B 16 are affected, then a task is uploaded to the secure client-account A 30 and a task is uploaded to the secure client-account B 32. In one embodiment, the create-update-folders tool 150 allows selection of all of impacted clients, or a subset of impacted clients. In addition the create-update-folders tool 150 allows selection of all or some of the impacted program modules listed in the code objects.

Each task is then retrieved by a respective client-side task manager 126, which passes the task to an appropriate handler program 128, 130, or 132 (e.g., create-update-folders handler) running in the client environment. Routing tasks by the task manager 126 might be based on various criteria such as a format of the task file or header information. The handler program 128, 130, or 132 then creates and updates the folders in the respective client environment, such as on a development machine running in the client environment. In one embodiment, the create-update-folders handler creates a "before" folder and an "after" folder.

In a further embodiment, the folder structure created by the handler program 128, 130, or 132 is based on the types of program modules that are affected by the update (e.g., the program modules identified in the request file). A first type of program module includes COBOL programs, DMS scripts associated with COBOL stored SQL statements, and SQR/SQC program modules. These might all be categorized as batch program modules. Another type of program module involves DMS scripts used to update data tables that control the operation of the software program. These are not typically a permanent part of the software program, but are used at the time that an update is installed on the client's system. Other types of modules exist, such as object-oriented code that is online or batch.

Figure 3:
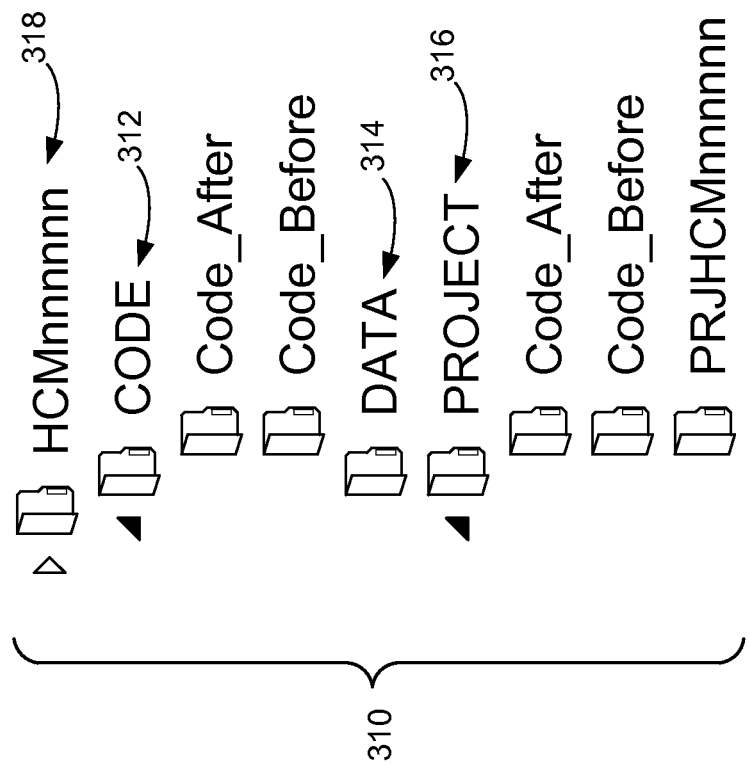
FIG. 3 depicts an exemplary client-environment folder structure in accordance with an embodiment of the present invention.

These different types of program code might be stored in different locations within the folder structure in the client environment 114. An exemplary folder structure 310 involving elements from all three levels is illustrated in FIG. 3; however, some updates might only contain a subset of these elements. In one embodiment, a similar folder structure is located on each of the client environments impacted by a particular update, and most of the program code stored in this folder structure is associated with the specified client and update.

In FIG. 3, SQR/SQC programs, COBOL programs, and DMS scripts associated with COBOL stored SQL statements are stored under the "CODE" folder. In addition, there will be "before" and "after" versions of the program source code stored in the "Code_Before" and "Code_After" folders. If the update involves a new program not previously included with the software program, then there would be no "before" version of that program.

DMS scripts used to update data tables would be stored in the "DATA" folder. The online code that will be modified by the update will be stored in the "Code_Before" and "Code_After" folders under the "PROJECT" folder. The "PRJHCMnnnnnn" folder will contain project export files.

Once the appropriate "before" folder and "after" folder have been created in the client environment, the client-side handler program (e.g., 128, 130, or 132) populates those development folders with the version of the program objects that were selected prior to an update being implemented. In some embodiments the program objects are copied from a different folder on the client machine to the development folder. In other embodiments, code objects might be extracted, such as from the Software-Program database 136, and placed in the appropriate folder in the client environment After all of the before-code is gathered, the create-update-folders handler calculates hash values for the program files gathered and generates a return request that is loaded back to the secure account 119 to be picked up by the update-service task monitor 120. The return request includes the hash values and file names, which are used to build a substantially similar folder structure and client folders on the file share 123 (as previously described). Each return request from each of the client environments will allow its own respective client-level folders to be built on the file share 123 and populated with the hash files.

Figure 4:
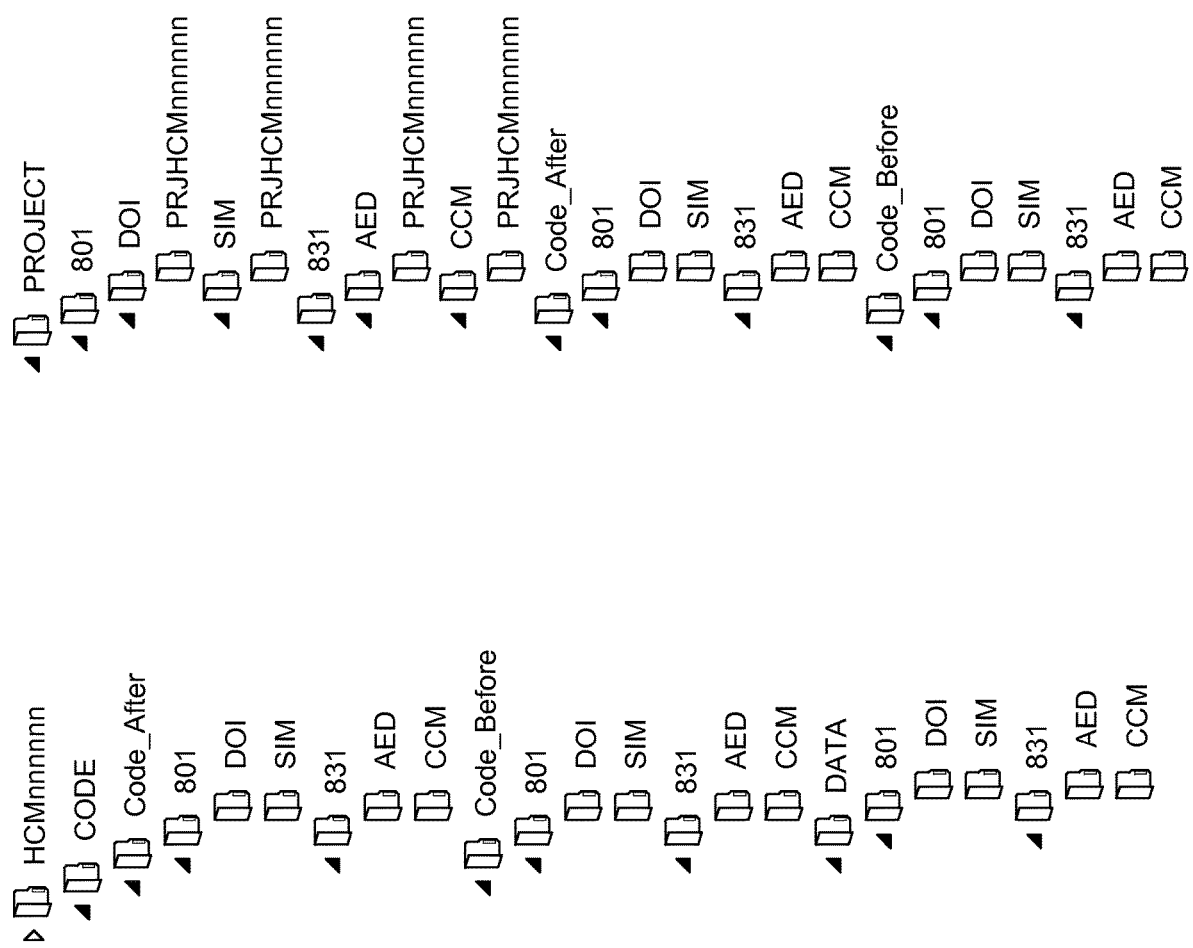
FIG. 4 depicts an exemplary file-share folder structure in accordance with an embodiment of the present invention.

An example of a folder structure that might be built in the file share 123 is depicted in FIG. 4. This folder structure reflects a composite of the associated folders on all of the client environments and depicts the complete list of clients impacted by the update. The folder contents include the same file names as are stored in the corresponding folders in the client environments, except that the files in the file share 123 have an additional file extension of ".hsh" indicating they are "hash files".

The hash files do not contain any actual source code. Instead, each contains only a "hash value" that was calculated on the client environment by computing a standard MD5 hash value using the actual file contents. This MD5 hash value is a unique 32 byte value calculated by an industry standard routine that yields a value which is unique to the contents of that particular file. Because the MD5 hash values calculated for identical files will also be identical, the hash value can be used to identify which clients have identical program versions by comparing their respective hash values. If the hash values on the file share 123 are identical, then the program modules in the client environments are identical.

In another embodiment, to implement an update it might be appropriate for the client environment to produce a script, which is usable to update table data (e.g., tax-table data). As such, a generate-data-changes tool 152 is utilized by the workstation 116 to create a task. When using the generate-data-changes tool 152, an update is selected and change data that is retrieved is included as part of the task instructions, which are loaded into the account(s) of the impacted client environment(s). The task is then run in each of those client environments, in which the task manager 126 passes the task to a generate-data-changes handler program on running in the client environment 114 (e.g., one of the handler programs 128, 130, or 132). The generate-data-changes handler program then produces a SQL script to update the tables. As previously described, request files are provided back to the secure account 119 and are pulled by the update-service task monitor 120 with appropriate folder-structure information and hash values.

As previously indicated, the status of a create-update-folder task or a generate-data-changes task can be monitored. Once a respective folder structure has been created in each client environment that is impacted by an update, the task-development module 122 can create a summary report to verify that the impacted client environments have not reported any missing program modules and that the hash was successfully received for each program module.

With the folder structure in place in the impacted client environments, code modifications from one client environment can be applied to identical program modules in another client environment. For example, an apply-difference task can be created and loaded to a selected secure account 119 in order to identify the code modifications that were already made in one client environment and that can be syndicated to the other client environments. The task manager 126 for the selected client environment requests the apply-difference task and passes the task to the appropriate handler program (i.e., one of the handler programs 128, 130, or 132). In one embodiment, the handler program modifies the program modules that have been stored in the "after" folders to include the update. In addition, the handler can generate a set of data that indicates the difference between the original and updated code. This data set may be created by using a software tool that compares the program module in the "before" folder to the modified program module in the "after" folder, determining which characters in the code have been changed on a character-by-character basis. The data set might then be provided back to the update service to serve as a record of the changes associated with a given update. In one embodiment, the data set may then be used to update other client environments having identical versions of the program.

In a further embodiment, the data set recording the difference between the before and after is encoded in a manner that avoids directly indicating the altered characters. One exemplary encoding method encodes the data set by applying a cipher key that relies on un-altered characters in the code. Because the encoding method is based on the code itself, other client environments that have identical version of the program can decipher the encoded data set and apply the changes indicated by the data. Decoding the encoded data set might include various strategies. In one embodiment the encoded data set may comprise instructions for substituting characters impacted by an update ("dynamic characters") with characters at other locations in the code ("static characters"). For instance, the encoded data set may reflect the location of the dynamic characters. For each such dynamic character, the data set may also identify the location of a static character that matches the updated value for the dynamic character. By replacing the value of the dynamic character with the value of its associated static character, the code may be updated using the encoded data set.

As previously described the client-side program handlers "create-update-folders," "generate-data-changes," and "apply-difference" act on code and/or data modifications for a single update. In other embodiments, individual updates for a client can be delivered in an update bundle, which may contain one or more individual updates. In one embodiment, a create-update tool 154 is utilized by the workstation 116 to create a task. When using the create-update tool 154, an update bundle is selected, then, impacted client environments are selected. A list of individual updates to package together, based on the attributes of each particular client environment (e.g., what updates they are supposed to receive based on their tax jurisdiction, release, etc.), are included as part of the task instructions, which are loaded by the create-update tool into the accounts of the impacted client environments. The task is then run in each of those client environments, in which the task manager 126 passes the task to an appropriate client-side, create-update handler. The create-update handler then retrieves the code, projects, and data change scripts to be delivered, combines them into an update bundle, and places the update bundle in a staging area of the client environment, ready for automated installation and manual testing by a Quality Assurance tester.

With the individual update and/or update bundle in place in the client environments, code and/or data modifications can be tested in one of the client environments. In another embodiment, an apply-update tool 156 is utilized by the workstation 116 to create a task. When using the apply-update tool 156, an update (individual or bundle) is selected, then, impacted client environments are selected. Task instructions are loaded into the accounts of the impacted client environments. The task is then run in each of those client environments, in which the task manager passes the task to a client-side, apply-update handler. The handler then retrieves the update code, projects, and data change scripts, copies those objects to a testing area of the client environment, and installs the code and/or data modifications automatically. When an update includes data changes scripts, a report is created by comparing the data before installing the update to the data after installing the update. When an update includes program code modifications, a report is created by comparing the code in the "before" folder and the "after" folder after installing the update. Quality Assurance testers can use these reports to help verify correctness of the update.

In another embodiment a document-generation tool 158 produces documentation that is tailored to each client environment for each update delivered. The document-generation tool 158 takes as input a master documentation template and then outputs a separate set of documentation for each selected client. The documentation template contains various tags, such as update id, client code, application release, module release, tax jurisdiction, etc. Based on the attributes of each particular client (e.g., what updates they are supposed to receive based on their tax jurisdiction, release, etc.), the utility produces the appropriate documentation.

In another embodiment, a package-verify tool 160 checks for consistency between the generated documentation, and the actual update to be delivered to the client. The package-verify tool 160 performs various checks, such as verifying files, verifying updates, and verifying projects. Verifying files includes checking to ensure all files included in the bundle are also in the documentation, and vice versa. Verifying updates includes checking to ensure the code contains enhancement markers for updates listed in documentation. Verifying projects includes checking to ensure all online objects in the bundle are also in the documentation, and vice versa. The package-verify tool will flag where there are any inconsistencies so they can be corrected before delivery.

The document-generation tool 158 and the package-verify tool 160 automatically generate documentation that is tailored to each client and verify that the documentation is in sync with the deliverable. That is, there is nothing delivered that is not documented, and nothing documented not delivered.

Referring now to FIG. 5, a flow diagram is depicted that includes a series of steps or operations that are carried out in accordance with an embodiment of the present invention. The series of steps in FIG. 5 comprises a method or process 510 of updating software in a distributed computing environment. The invention might be embodied as a computer-implemented method that includes the steps summarized in FIG. 5. The invention might also be embodied as a computing device that is programed to perform the operations outlined in FIG. 5. In another embodiment, the present invention includes a computer-storage device storing computer-executable instructions that, when performed by a computing device, perform the method 510. When describing method 510, reference is also made to FIGS. 1 and 2.

In method 510, step 512 includes receiving by a secure network-accessible server a task that is tailored for a client environment. For example, server 118 receives a task that has been created using the workstation 116, which leverages the task-development module 122. At step 514 the task is stored in a secure account that is dedicated to the client environment. For instance, the task is stored in a secure account 119 that is dedicated to the client environment 114. In one embodiment, the secure network-accessible server includes an internet-accessible FTP server and the secure account is an FTP account.

Step 516 includes receiving a request from an automated task manager running on a client device in the client environment, which is authenticated to the secure account, to send the task. For example, a request is received from the task manager 126 to send the task. In step 518, the task is transmitted to the automated task manager. And step 520 includes updating a status of the task.

The steps of method 510 might include other steps or elements. For instance, in one embodiment the operations further comprise monitoring the secure account by a task-monitoring module to determine when the task is queued up in the secure account and when the task is transmitted to the task manager. In addition, the operations might include rendering a task-monitor user interface that communicates with the task-monitor database 140 and that presents the status. In a further embodiment, updating at step 520 includes changing the status from a pending status to an active status by the task-monitoring module when the task is transmitted to the task manager. In addition, the operations 510 might also include receiving a message from the automated task manager that the task is successfully completed, such that updating in step 520 includes picking up the message by the task-monitoring module and transforming the status from active to a successful-completion status. In a further embodiment, the task-monitor user interface provides a selectable link that, when selected, presents contents of the message that was received from the automated task manager. In another embodiment, the operations 510 further comprise receiving a message from the task manager indicating that the task was not successfully completed. Again, a task-monitoring module might pull the message from the secure account and update the status to include a failed status, the content of the message being viewable in a task-monitor user interface.

Referring now to FIG. 6, a flow diagram is depicted that includes a series of steps or operations that are carried out in accordance with an embodiment of the present invention. The series of steps in FIG. 6 comprises a method or process 610 of updating software in a distributed computing environment. The invention might be embodied as a computer-implemented method that includes the steps summarized in FIG. 6. The invention might also be embodied as a computing device that is programed to perform the operations outlined in FIG. 6. In another embodiment, the present invention includes a computer-storage device storing computer-executable instructions that, when performed by a computing device, perform the method 610. When describing method 610, reference is also made to FIGS. 1 and 2.

Step 612 includes automatically determining whether a task is queued up by sending a request to a secure account stored on a secure network-accessible server in a server environment. For example, the task manager 126 might send a request to the secure account 119 to determine whether a task is queued up in the account. In step 614 the task is received from the secure network-accessible server hosting the secure account, and the task is received by a task manager running in a client environment.

Step 616 includes routing the task to a handler program that is running in the client environment and that carries out the task. For example, the task manager 126 might pass the task to the appropriate one of handlers 128, 130, and 132. At step 618, the handler program generates a message that describes whether the task was successfully completed. The message is communicated 620 from the handler program to the task manager. Step 622 includes sending the message to the secure network-accessible server to provide a status of the task.

The steps of method 610 might include other steps or elements. For instance, the task might include updating a software program running in the client environment, such that the handler program performs the task by transforming the software program to include an update. In another embodiment, updating the software program running in the client environment includes creating a before-update folder in the client environment and populating the before-update folder with a first version of the software program that is to be updated. In addition, the operations 610 might also include calculating a hash value for the first version of the software program and transmitting the hash value to the server running in the server environment. In another embodiment, the operations 610 further include creating an after-update folder in the client environment and populating the after-update folder with a second version of the software program that is to be updated and that is substantially similar to the first version of the software program. Accordingly, updating the software program running in the client environment might include transforming the second version of the software program in the after-update folder to include the update, thereby transforming the software program into an updated software program. In yet a further embodiment, the operations further include generating a data set by comparing the first version of the software program in the before-update folder to the updated software program in the after-update folder, and transmitting the data set to the secure network-accessible server in the server environment. The data set might be encoded to create an encoded data set, which is transmitted to the secure network-accessible server to be made available for other client environments running identical program modules as the first version of the software program. The encoded data can then be utilized by the other client environments to transform the first version of the software program into an updated software program.

Having generally described some embodiments of the present invention, a general computing environment is now described with respect to FIG. 7. That is, embodiments of the present invention might include, among other things, a computing device, a component of a computing device, a computer-readable medium or other device that stores instructions executed by a computing device, a method that is executed by a computing device, and the like. Thus, these various embodiments might include at least some of the elements described with respect to FIG. 7.

FIG. 7 illustrates an exemplary computing environment for implementing embodiments of the present invention and is generally designated as computing device 700. Computing device 700 is but one example of a suitable computing environment and is not intended to suggest any limitation as to the scope of use or functionality of invention embodiments. Neither should the computing environment 100 be interpreted as having any dependency or requirement relating to any one or combination of components illustrated.

Embodiments of the invention might be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, radio 717, input/output ports 718, input/output components 720, and an illustrative power supply 722. Bus 710 represents what may be one or more busses (such as an address bus, data bus, or combination thereof).

Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EEPROM; flash memory or other memory technology; CD-ROM; digital versatile disks (DVD) or other optical disk storage; magnetic cassettes, magnetic tape, magnetic disk storage or other magnetic storage devices; or other computer memory devices which can be used to store the desired information and which can be accessed by computing device 700.

In contrast with storage media, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 712 includes computer-storage media in the form of volatile and/or nonvolatile memory. The memory may be removable, nonremovable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 present data indications to a user or other device. Exemplary presentation components include a display device, speaker, printing component, vibrating component, etc.

Radio 717 functions to send and receive signals from a network, such as a telecommunications network. I/O ports 718 allow computing device 700 to be logically coupled to other devices including I/O components 720, some of which may be built in.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory, computer-readable storage media storing information that, when executed by one or more computing devices, performs operations for updating software in a distributed computing environment comprising:
automatically determining, by an automated task manager running in a client environment of one or more client devices, whether a task is queued up by sending a request to a secure account stored on a secure network-accessible server in a server environment;
receiving, based on the determining, the task from the secure network accessible server hosting the secure account, wherein the task is received by the task manager running in the client environment and wherein the task includes an update to be applied to a software program running in the client environment;
routing the task to one or more handler programs that are running in the client environment and that update the software program by:
creating a before-update folder and an after-update folder in the client environment;
populating the before-update folder with a first version of the software pro-gram that is to be updated;
populating the after-update folder with a second version of the software pro-gram that is to be updated and that is substantially similar to the first version of the software program;

transforming the second version of the software program into an updated software program by transforming the second version of the software program to include the update;

generating a data set by comparing the first version of the software program in the before-update folder to the updated software program in the after-update folder and by identifying one or more differences between the first version and the second version, the one or more differences being included in the data set, which does not include the first version and the second version of the software program, and transmitting the data set to the secure network-accessible server in the server environment;

generating by the one or more handler programs a message that describes whether the task was successfully completed;

communicating the message from the one or more handler programs to the task manager; and sending the message to the secure network-accessible server to provide a status of the task.

2. The computer-readable media of claim 1 further comprising, calculating a hash value for the first version of the software program and transmitting the hash value to the server running in the server environment.

3. The computer-readable media of claim 1, wherein the operations further comprise encoding the data set to create an encoded data set, which is transmitted to the secure network-accessible server.

4. A system of computing components that automatically updates a computer software program in a distributed environment comprising:

a server-side computing device having a processor coupled to computer-readable storage media, which stores a secure account that is maintained in a server environment and that stores a task to be carried out in a client environment the task including an update of a software program running in the client environment;

a client-side, computer-readable storage media storing a client-side program file structure that is maintained in the client environment and that stores one or more code files, which include program code executed to run the software program; a server-side, computer-readable storage media storing a server-side pro-gram file structure that is maintained in a file share of the server environment and that substantially mirrors an organization of the client-side program file structure, the server-side program file structure storing one or more hash files representing the program code, such that the server-side program file structure does not maintain a copy of the program code;

an automatic task manager that runs on a client-side computing device in the client environment and that automatically retrieves the task by sending a request to the secure account, wherein the automatic task manager determines a task is available, and retrieves the task based on the determining;

one or more handlers running in the client environment that receive the task from the automatic task manager and that carry out the task in the client environment, wherein the one or more handlers provide a message that indicates whether task was successfully completed and that is provided to the secure account; and a task-monitor module running in the server environment that picks up the message from the secure account and that communicates the message to a task-monitor graphical user interface, wherein the task-monitor graphical user interface displays a status of the task indicating whether the task was successfully completed in the client environment and displays a selectable link that, when selected by an input device, displays content of the message.

* * * * *